United States Patent [19]

Masters

[11] Patent Number: 5,134,569
[45] Date of Patent: Jul. 28, 1992

[54] SYSTEM AND METHOD FOR COMPUTER AUTOMATED MANUFACTURING USING FLUENT MATERIAL

[76] Inventor: William E. Masters, 313 Dogwood La., Easley, S.C. 29640

[21] Appl. No.: 371,084

[22] Filed: Jun. 26, 1989

[51] Int. Cl.$^5$ .............. G06F 15/46; B28B 17/00; B28B 1/14; B27G 11/02
[52] U.S. Cl. ............... 364/474.24; 156/379.6; 156/59; 156/272.8; 264/308; 425/162; 425/174
[58] Field of Search ............ 364/474.24, 469, 473, 364/477; 156/379.6, 59, 272.8, 244.11; 264/22, 308, 309, 211.13, 211.12, 219; 219/121.73; 425/162, 174, 174.4; 365/119, 111

[56] References Cited

U.S. PATENT DOCUMENTS

| | | | |
|---|---|---|---|
| 4,078,229 | 3/1978 | Swanson et al. | 365/111 |
| 4,238,840 | 12/1980 | Swainson | 365/119 |
| 4,247,508 | 1/1981 | Housholder | 264/308 |
| 4,333,165 | 6/1982 | Swainson et al. | 365/119 |
| 4,575,330 | 3/1986 | Hull | 364/473 |
| 4,665,492 | 5/1987 | Masters | 364/474.24 |
| 4,710,253 | 12/1987 | Soszek | 156/272.8 |
| 4,749,347 | 6/1988 | Valavaara | 264/219 |
| 4,752,352 | 6/1988 | Feygin | 219/121.73 |
| 4,915,757 | 4/1990 | Rando | 156/59 |
| 4,943,928 | 7/1990 | Campbell et al. | 364/477 |
| 4,961,154 | 10/1990 | Pomerantz et al. | 425/174.4 |
| 4,961,886 | 10/1990 | Eckstein et al. | 425/174.4 |

*Primary Examiner*—Jerry Smith
*Assistant Examiner*—Jim Trammell
*Attorney, Agent, or Firm*—Cort Flint

[57] ABSTRACT

A system and method for constructing a three-dimensional object (10) from a design created on a CAD machine (14) is disclosed which includes a support (B) which may be indexed along two coordinate axes (X, Y) and a movable dispensing head (A) which indexes along a Z-axis. A fluent material (54) is dispensed or extruded from head (A) and as it is dispensed, the fluent material is subjected to a treatment by treatment sources (D) which cause the fluent material to transform into a fixed solidified state in the form of a three-dimensional object. Fluent material (54) may be a polymeric material which is solidified by an energy beam of ultraviolet light (56) upon dispensing. A shield (E) is provided to shield the dispensing head (A) and strand of material (54) so that the material is treated at the proper time and location to cause it to solidify properly to form the three-dimensional object. In accordance with the method, indexing takes place in desired steps so a dimensionally accurate object is formed.

47 Claims, 3 Drawing Sheets

SYSTEM AND METHOD FOR COMPUTER AUTOMATED MANUFACTURING USING FLUENT MATERIAL

BACKGROUND OF THE INVENTION

The invention relates to the automated manufacturing of a three-dimensional object whose design has been created with a computer aided design (CAD) machine.

Modern day manufacturing technology continues to grow in complexity and sophistication. The result is a great need for flexibility in the manufacturing process. Several systems and methods for manufacturing three-dimensional objects which have been designed on a computer have been proposed. However, turning a computer aided design into a solid three-dimensional object quickly and inexpensively remains a problem to which considerable attention need be given.

Technology, commonly referred to as direct cad manufacturing (DCM), has been rapidly developing. In desk top manufacturing, a three-dimensional object is created on a computer screen using a CAD program. Any physical product that is designed, shaped, or prototyped prior to production could benefit from DCM. Industries that may use DCM include automotive, aerospace, appliance, toy manufacturers, and any process that involves the design, redesign, prototyping, and production of three-dimensional models, molds, patterns, or short production runs. Designs that once required weeks or months to be turned into actual models or prototypes can become objects in a matter of hours or days using DCM. Using DCM, a design can be recalled from a library and the object manufactured in just a short period of time, thus eliminating the need for large inventories. Basically, there are five identifiable desk top manufacturing systems and methods.

First is ballistics particle manufacturing as disclosed in U.S. Pat. No. 4,665,492. In this system, the coordinates of a three-dimensional design are stored in a computer data base. Particles are directed to specific locations and built up and deposited to construct the desired object. Second, in photochemical machining, shapes are formed by the polymerization of a monomer, or by sculpting a solid block of plastic, for example, see U.S. Pat. Nos. 4,078,229; 4,238,840; and 4,571,377. In polymerization, one laser may pump a photo initiator or photosynthesizer, while a second laser pumps energy. Polymerization takes place where the two beams intersect. When using the other sculpting technique, a block of rigid plastic is carved by degrading material at the intersection of the two beams. Third is laminated object manufacturing where objects are constructed by the successive definition of thin layers of powdered plastics or metals, thin layers of powder are deposited, then compressed with a heated press platform or by roller compression. Pulses from a single laser then sinter or melt the powder in the desired cross-sectional shape and to the required depth. An example of this type system can be seen in U.S. Pat. No. 4,752,352. Fourth is selective laser sintering where objects may be fabricated by the successive deposition and sintering of thin layers of powdered material, either plastic or metal. The powder layers are spread by a feeding mechanism, but are not compressed. Sintering energy can come from a laser or other suitable direct beam of energy. Fifth, stereolithography is a form of stereolithographic printing wherein a single laser beam cures successive thin layers of liquid monomer by a series of controlled photopolymerization reactions such as shown in U.S. Pat. No. 4,575,330.

Further, U.S. Pat. No. 4,749,347 discloses a topology fabrication apparatus in which a three-dimension solid body having a predetermined topography is automatically manufactured using an extrusion process. Thin sections of the solid body are extruded and successively built up next to each other to form the topographical form such as a topology model made from topographical map information. This system requires a fairly sophisticated apparatus and control for forming what is a relatively simple form. The types of objects which can be made with such an apparatus and control are relatively limited.

Accordingly, it can be seen that the field of desk top manufacturing or computer aided manufacturing is one in which considerable activity and attention need to be given. While the above systems and methods are all candidates for a practical system, a need for the development of more reliable and practical systems and methods still exists.

Accordingly, an important object of the present invention is to provide a method and system for the computer aided manufacture of three-dimensional objects which is reliable and practical.

Another object of the present invention is to provide a system and method for automatically manufacturing three-dimensional objects whose design has been created on a CAD machine using practical hardware and methods.

Another object of the present invention is to provide a system and method for automatically manufacturing a three-dimensional object whose design has been created on a CAD machine wherein the object may be accurately formed in a simple and reliable manner under ordinary manufacturing.

SUMMARY OF THE INVENTION

The above objectives are accomplished in accordance with the present invention by providing a computer machine which creates a design for a three-dimensional object and a data file of the corresponding three-dimensional coordinates. The data file is used to control servos which index and position a dispensing head which extrudes a generally continuous strand of fluent material on a base which is indexed in the remaining coordinate directions. As the dispensing head and support are indexed, material is extruded through an orifice having a desired cross-sectional profile and is treated upon being dispensed to solidify to construct the three-dimensional object. In a preferred embodiment, a polymeric material is extruded in a fluent state and is subjected to a radiation beam for transition into the solid three-dimensional object. A shield is provided about the dispensing head so that the dispensed material is contacted by the radiation beam at the proper time of location for transition. The sources of radiation are disposed relative to the dispensing head so that a prescribed time period is established between the time the material leaves the tip of the dispensing head and the time at which the radiation beam contacts it. By making this time constant, a dimensionally accurate object is produced. Controlling the indexing steps of the movement of the servo and control of the cross-sectional profile of the strand dispensed, the result is increased dimensional accuracy of the object.

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
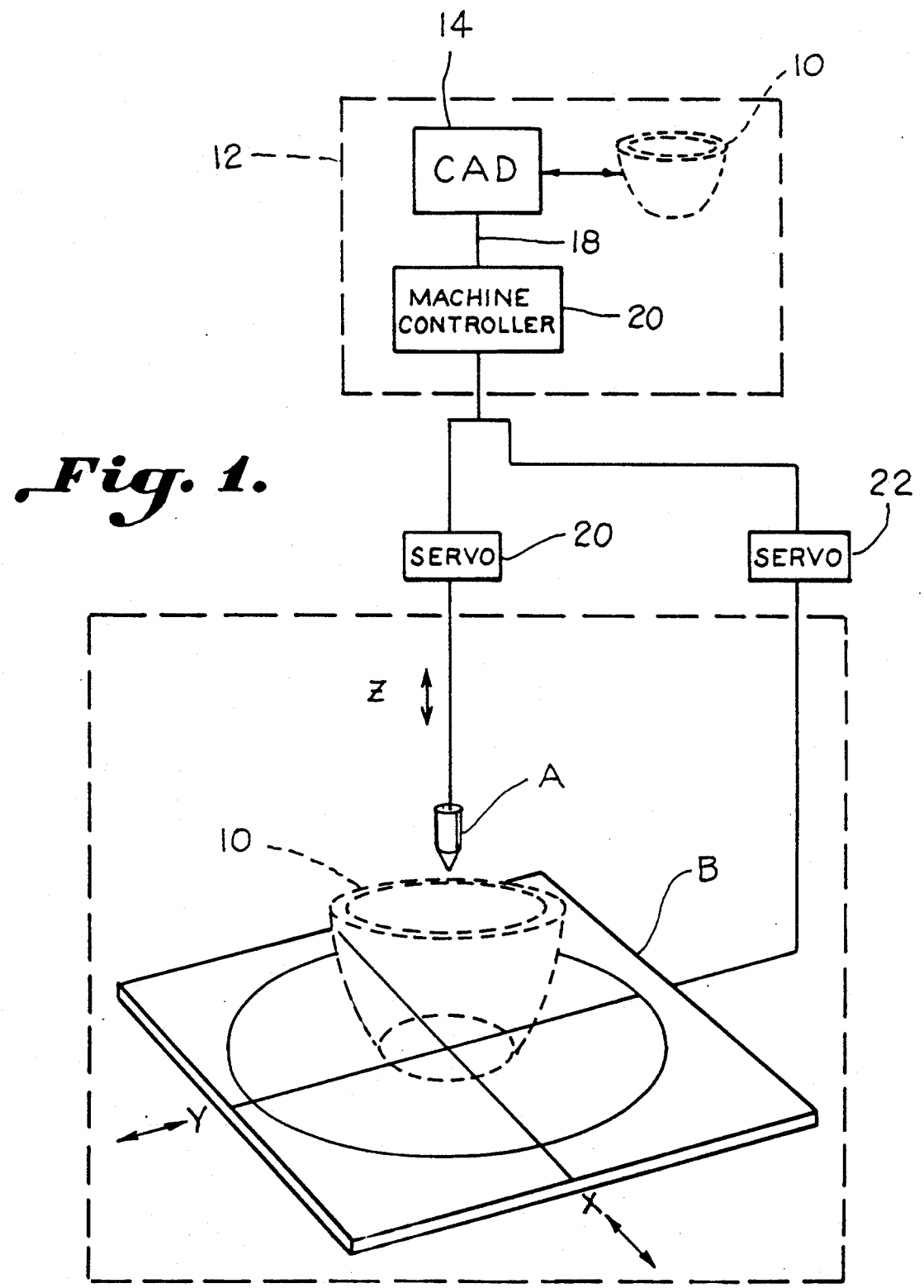
FIG. 1 is an isometric view of a system and method for automatically manufacturing a three-dimensional object from a design created on a CAD machine in accordance with the present invention.

The invention relates to the automatic manufacture of a three-dimensional object whose design has been created on a CAD machine.

Referring now in more details to the drawings, an object 10 in the form of a cup is illustrated which has been designed by a computer system 12 which includes a computer machine 14 which designs the object 10 by instructions from a draftsman or designer. Computer machine 14 may be any suitable machine such as a CAD machine. In a conventional CAD machine, a designer uses a natural dialogue to talk to the computer machine by way of a data tablet and/or keyboard. He instructs the machine to create, scale, rotate, modify, and/or label various elements of the design or drawing. The CAD machine answers by interpreting the instructions, accomplishing what it was directed to do, displaying the results on the terminal CRT screen, and compiling a data file corresponding to the design produced and displayed. When the drafting and design effort is complete, the data file containing coordinate information of the three-dimensional design may be stored on a hard disk or other computer storage medium for archival purposes.

In accordance with the invention, the data file, which may be in the form of coded binary information, is transferred to a machine controller 16 which forms part of the computer system 12. Any suitable computer software may be utilized to transfer this coded binary information into machine control information for input into the machine controller 16. The machine controller 16 sends signals to a pair of servo means 20 and 22 to position the material dispensing means A and a movable support means B, respectively. The control of the servo means may be had as is conventional in those type of devices commonly referred to as computer aided manufacturing machines. Computer machine 14 which designs the part and the computer machine 16 which controls the servo mechanism in response to the data file of three-dimensional coordinates may be any suitable CAD and CAM machines. Alternately, computer system 12 may include an integrated computer machine which incorporates the functions of both the CAD and CAM controller. Servo means 20 controls material dispensing means A which may be any suitable working head for dispensing fluent materials such as an extrusion nozzle. While it is conceivable that droplets or segments of fluent material may be dispensed, it is contemplated that a continuous strand of fluent material will be extruded from the head. Servo means 20 moves material dispensing means A in opposing directions along a Z-axis. Support means B may be any suitable base or support upon which a three-dimensional object is constructed according to the design created on the CAD machine. Servo means 22 moves support means B in orthogonal directions in the XY plane.

Figure 2:
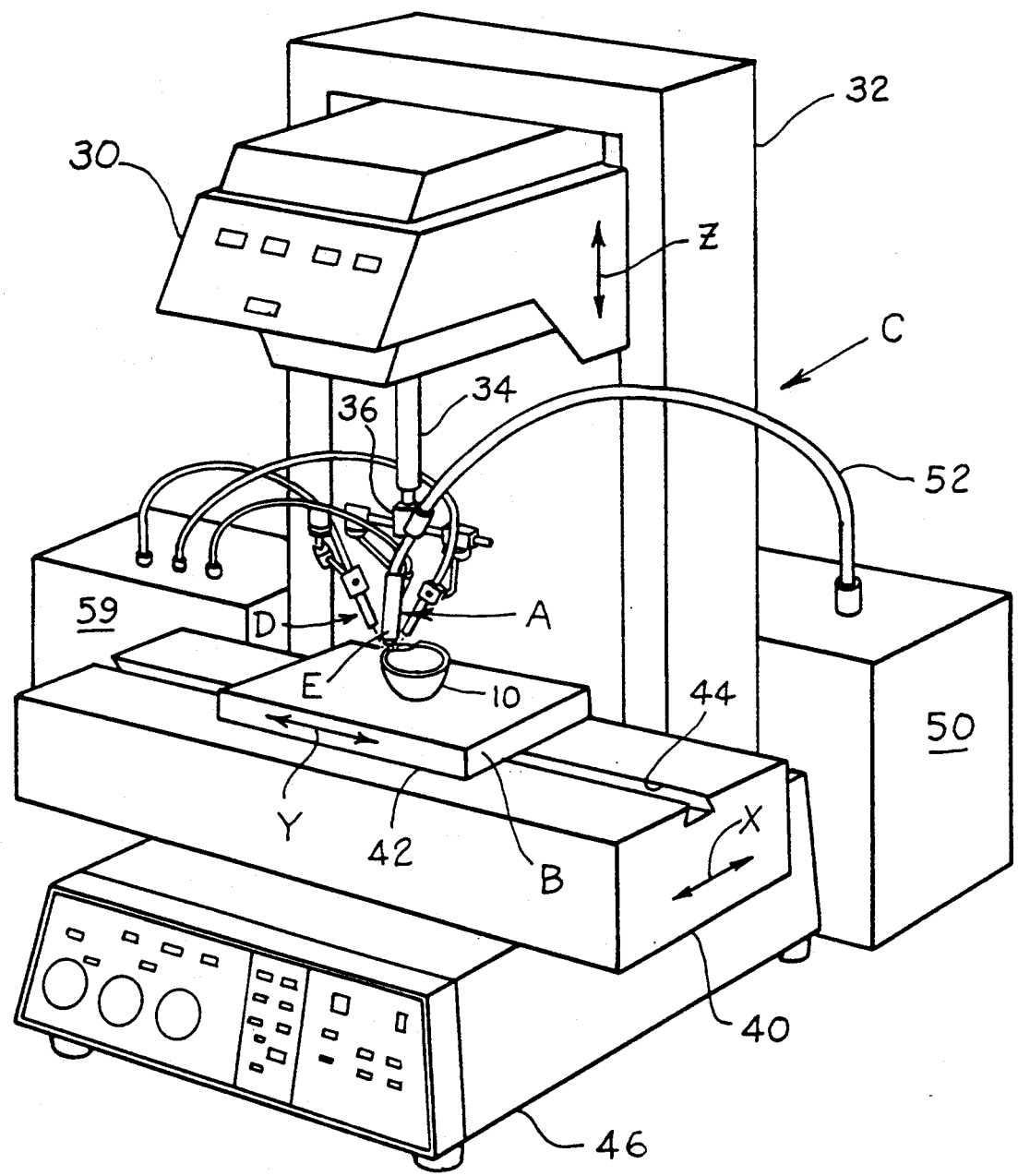
FIG. 2 is a perspective view of a system and method for automatically manufacturing a three-dimensional object from a design created on a CAD machine in accordance with the present invention.
Figure 3:
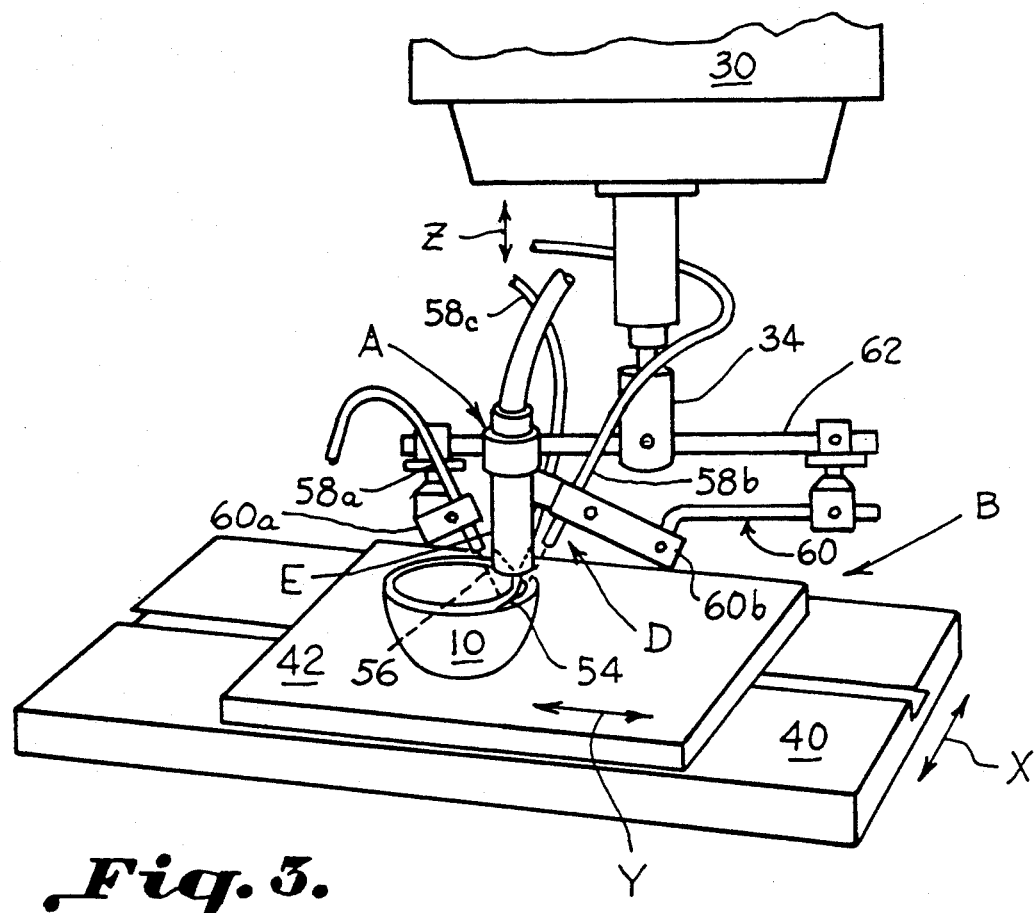
FIG. 3 is a close up perspective view illustrating a system and method for automatically manufacturing a three-dimensional object from a design created on a CAD machine in accordance with the present invention.
Figure 4:
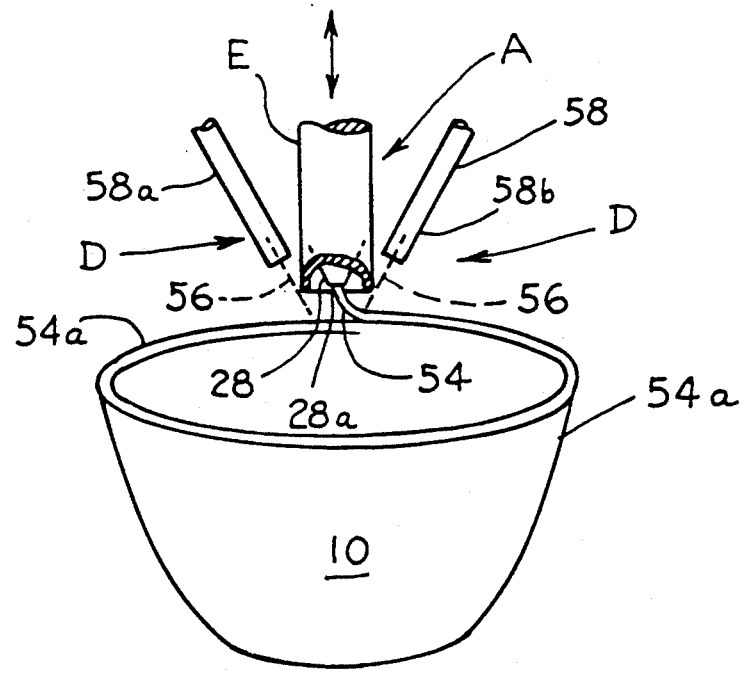
FIG. 4 is an enlarged isometric view illustrating a system and method according to the present invention for automatically manufacturing a three-dimensional object in accordance with the invention.

As can best be seen in FIGS. 2-4, a preferred embodiment of the invention is illustrated wherein material dispensing means A includes a global dispensing head 28 carried by a carriage 30 which moves vertically along the Z-axis within a standard 32 which may be suitably journaled to slidably carry the housing in reciprocating vertical movements. A post 34 serves as a carrier for dispensing means A which may be clamped to the post by any suitable means such as clamp 36. Support means B includes a first platform 40 movable along the X-axis and a second platform 42 which moves along the Y-axis. Platform 42 may include a key, not shown, which slides in a keyway 44 in platform 40. Platform 40 may slide by means of any suitable mechanism on base housing 46 which may also carry standard 32 fixably. Servo apparatus C may be any suitable machine such as that manufactured by Roland, Inc., and sold under the designation of Model No. CADD 3.

A source 50 of fluent material is provided which is connected to dispensing head A by means of a conduit 52. Source 50 is pressurized with compressed air to dispense or extrude a material through conduits 52 and head 28. Fluent material 50 may be any suitable chemical composition which may be transformed from a fluent state to a fixed state in order to solidify the material in the form of the three-dimensional object. One suitable material is a resin manufactured under the designation Litetak 375 which is commercially available from the Locklite Corporation of Newington, Conn. This is a polymer material which can be hardened or solidified with an energy beam of ultraviolet light.

Material treatment means, designated generally as D, is provided for treating fluent material 54 as it is dispensed from dispensing means A to cause the material to undergo a transition from its fluent state to its fixed state in which it solidifies to form the three-dimensional object being designed. As can best be seen in FIGS. 3 and 4, material treatment means D includes a plurality of ultraviolet light beams 56 emitted from a plurality of light tubes 58 which, preferably, are equally angularly spaced around dispensing means A. Light tubes 58 are carried by suitable bracket means 60 which are attached to a T-arm 62 of post 34. Ultraviolet light coming from a radiation source 65 are directed by light tubes 58. Radiation source 65 may be any suitable source of ultraviolet radiation or light such as a model ZETA 7000 manufactured by Locklite Corporation of Newington, Conn. Material treatment means D may be any suitable means for causing the material to solidify and form a three-dimensional object, and depending upon the type of material being used. For example, material treatment means D may include a chemical composition in which two or more chemicals are mixed internally in the fluent material so that upon dispensing, fluent material 54 solidifies. Alternately, the treatment means may be a second chemical composition which is mixed with a first chemical composition dispensed by dispensing means A after it is dispensed. The material treatment means may be a concentrated energy beam of heat, laser energy, or other radiation energy, all of which depend on the fluent material utilized.

A shield means E for shielding dispensing head 28 is provided. Shield means E shields dispensing head 28 and dispensed material 54 so that the material is subjected to the treatment of material treatment means D at the proper time and position to cause effective transformation and solidification. This is particularly important when material 54 is laid and built up as a continuous strand in layers. Solidification of the layers at the proper position and time is important for the accurate and reliable construction of the three-dimensional object. As illustrated, shield means E is a cylindrical shield. It is contemplated that the shield may be shaped and contoured in accordance with the application and object being made for optimum shielding and accurate formation. For example, it has been found that the round shield may create an elliptical shadow under certain lighting conditions (2 light tubes at 180 degrees on XY plane). When dispensing head 28 travels through the long axis of the ellipse, the tip to light time is longer than when it travels through the short axis. This may cause a nonuniform tip to light time. The tip to light time is the time period between the resin leaving the tip of dispensing head 28 until the ultraviolet light 56 contacts it. This tip to light time needs to be constant in order to achieve a dimensionally accurate object. It is contemplated that by reshaping the round shield to an ellipse, and mounting the shield so that the long axis of the shield is parallel to the light beams, the shadow will be more circular which will give a more constant tip to light time. Of course, other shapes, contours, and shielding techniques may be had in order to achieve the desired result of dimensionally accurate object construction.

Dimensionally accurate objects may also be a function of the arrangement of the material treatment means D. For example, when utilizing concentrated radiation such as ultraviolet light 58a, 58b, and 58c, it has been found that spacing these equal angularly, i.e. 180 degrees apart, with respect to cylindrical shield E results in a fairly accurate object formation. When utilizing ultraviolet light, it is preferred that base means B have a blackened surface which absorbs radiation so that reflected radiation does not result in adverse effects on solidification of material 54.

Servo means 20 which moves platforms 40 and 42, and servo means 20 which moves platform 30, must be controlled in their indexing time and steps in order to achieve dimensionally accurate object formation. This is particular true of indexing and the direction in which layers 54a of material 54 are formed. In this same respect, an orifice 28a of dispensing head 28 may be selected so that strand 54 has a prescribed cross-section depending upon the application and object being made. The dimensions and shape of the cross-sectional profile of strand 54 produced by the orifice will be a variable in the function of the step size of indexing, particularly in the Z-direction as shown. By controlling the step size, cross-sectional profile, tip to light time, and other variables, a dimensionally accurate object may be had in accordance with the invention. The smoothness of the object can be controlled in accordance with the invention by these variables, as well as the gap between the layers.

The following examples will be illustrative of the invention:

EXAMPLE 1

Object shape—a cylinder with a 15.0 mm diameter and 8.0 mm height.
Shield E—½ inch cylindrical height.
Dispensing head 28—16 gauge needle.
Material 54—Litetak 375.
Material treatment—2 ultraviolet light tubes approximately 10 degrees from the vertical, 480 degrees apart at the XY plane at 40 degrees from the Z-axis.
Distance from bottom of shield and dispensing head tip—1.0 mm; speed—12.0 mm per second.
Air pressure on material source 50—30 psi.
Indexing step in the Z direction—(approximately equal to the diameter of the strand).

EXAMPLE 2

Object shape—cone (30.0 mm base X 47.0 mm top).
Shield E—½ inch elliptical.
Dispensing head 28—16 gauge needle.
Material 54—Litetak 375.
Material treatment—2 ultraviolet light tubes approximately 180 degrees apart from the XY axis and 10 degrees from the vertical axis.
Distance between tip of dispensing head and shield —3.0 mm.
Air pressure—35 psi.
Bottom indexing—1.0 mm.
Wall indexing—out 1.0 mm; up 1.0 mm.
Speed—12.0 mm/second.
Base—black.

EXAMPLE 3

Object 10 T-cup—(30.0 mm base; 16.0 mm outward taper; 15.0 mm step up; and 47.0 mm top).
Shield E—7/16 circular.
Dispensing head 28—16 gauge needle.
Material 54—Litetak 375.
Material treatment—3 ultraviolet light tubes 58a, 58b, 58c with 58c 10 degrees from vertical, 58b 15 degrees from vertical, and 58a 5 degrees from vertical; lights 58b and 58a in the XY plane approximately 120 degrees apart.
Air pressure—33 psi.
Base—black.
Shield—approximately 2.0 mm above the needle tip.

While a preferred embodiment of the invention has been described using specific terms, such description is for illustrative purposes only, and it is to be understood that changes and variations may be made without departing from the spirit or scope of the following claims.

What is claimed is:
1. A system for constructing a three-dimensional object from a design created on a computer machine including:
   a) support means by which said object is supported while being constructed;
   b) material dispensing means for dispensing a strand of material in a fluent state;
   c) material treatment means disposed near said strand of material dispensing means for causing said material to undergo a transition from said fluent state to a fixed state in which said material is solidified and built up in a form of said three-dimensional object; and d) control means for generating control signals in response to coordinates of said design of said three-dimensional object and controlling the position of said material dispensing means and said material treatment means relative to said support means in response to said control signals to control dispensing and transition of said material to construct said object while supported with said support means.

2. The system of claim 1 including a gaseous atmosphere in which said support means is disposed.

3. The system of claim 1 including servo means for indexing and positioning said support means.

4. The system of claim 3 wherein said servo means and said support means are indexed in at least two dimensions.

5. The system of claim 4 wherein said servo means positions and indexes said dispensing means in a third dimension.

6. The system of claim 1 wherein said material dispensing means includes an extrusion means which dispenses a generally continuous strand of said material.

7. The system of claim 6 wherein said extrusion means includes a nozzle having an orifice through which said strand is dispensed and contoured to have a prescribed cross-sectional profile in accordance with the object being constructed.

8. The system of claim 1 wherein said dispensing means includes profile control means through which said material is dispensed in a generally continuous strand and by which controlling a continuous strand profile of said stand is controlled according to the object being produced.

9. The system of claim 8 wherein said profile control means includes an orifice through which said material passes.

10. The system of claim 1 wherein said material treatment means includes radiation means for focusing a beam of radiation upon said fluid material after said material is dispensed to solidify said material.

11. The system of claim 10 including shield means shielding said dispensing means from said radiation beam for controlling solidification of said material.

12. The system of claim 10 wherein said radiation means includes a plurality of ultraviolet radiation sources disposed in prescribed positions about said dispensing means.

13. The system of claim 1 wherein said material treatment means includes a chemical treatment means for subjecting said fluent material to a chemical treatment to fix said fluent material in a form of said three-dimensional object.

14. The system of claim 13 wherein said chemical treatment means includes a chemical mixture within said fluent material which causes said fluent material to solidify in said form of said three-dimensional object after leaving said dispensing means.

15. The system of claim 13 wherein said chemical treatment means includes means for mixing a chemical with said fluid material as it is dispensed from said dispensing means to solidify said fluent material.

16. The system of claim 10 wherein said material treatment means includes means for solidifying said fluent material in a form of said three-dimensional object using photopolymers.

17. The system of claim 10 wherein said material treatment means includes treating said fluid material with a laser means for solidifying said fluent material after it is dispensed by said material dispensing means.

18. The system of claim 10 wherein said radiation means includes a beam of heat energy generated by a heat source.

19. The system of claim 18 wherein said control means includes signal generator means for generating said control signals in response to said data file.

20. The system of claim 1 wherein said support means includes a base having a blackened support surface which absorbs radiation.

21. The system of claim 1 wherein said control means includes a data file of said three dimensional coordinates corresponding to said three dimensional design created on said computer machine.

22. The system of claim 1 including an assembly for carrying said material dispensing means and said material treatment means together as a working unit, said assembly being operatively connected to said servo means so that said dispensing means and treatment means are indexed together as a unit.

23. The system of claim 1 wherein said material dispensing means dispenses said fluid material is a form of a fluid strand.

24. A system for automatically constructing a three dimensional object from a design of the three dimensional object created on a computer machine comprising:

a) support by which said object is supported while being constructed;

b) material dispensing means for dispensing a fluent material in the form of a generally continuous fluid strand for constructing said object;

c) material treatment means for focusing a generally concentrated energy beam on said fluid strand after dispensing causing said material to undergo a transition from said fluent state to a fixed state in which said material is solidified to build up in layers and construct said object while supported by said support means; and d) control means for generating control signals in response to said coordinates of said three dimensional design of said object and controlling the position of said dispensing means and said material treatment means relative to said support means in response to said control signals to thereby control dispensing and transition of said material to construct said object while supporting with said support means.

25. The system of claim 24 including means for controlling the time and position at which said concentrated energy beam contacts said fluid strand of material after dispensing.

26. The system of claim 25 including means for controlling the intensity of said concentrated energy beam upon said strand of fluid material.

27. The system of claim 24 wherein said support means comprises a base having a blackened surface which absorbs energy from said energy beam to thereby prevent reflection of energy upon said fluid strand except where it is desired to contact said fluid strand for solidification.

28. The system of claim 24 including servo means for indexing the position of said dispensing means and said support means relative to each other in a stepidized manner having steps sized in accordance with a dimension of a cross-section of said strand of material.

29. The system of claim 24 including shield means shielding said material dispensing means from said concentrated energy beam so that said material is solidified at a prescribed time and positioned to facilitate adherence and build up of said material in said layers to construct said object with reduced shape distortion.

30. The system of claim 29 wherein said shield means comprises an electrically conductive shield which surrounds said material dispensing means.

31. The system of claim 29 including shield means for shielding said material dispensing means from induction heat.

32. The system of claim 29 including shield means for shielding said material dispensing means from microwaves.

33. An automatic process for manufacturing a three-dimensional object designed on a computer machine comprising:
   a) providing a design data file of coordinates representing said three-dimensional design;
   b) generating control signals based on said design data file; and
   c) dispensing a strand of material in a fluent state in response to said control signals and treating said strand of material after dispensing in a controlled time and dimensional relationship to said dispensing of said material so that said material undergoes a transition to a fixed physical state in which said material is solidified in an accurate form of said three-dimensional object.

34. The process of claim 33 including supporting said material by a support during dispensing; and indexing and moving said support in response to said control signals to assist said material in forming said three dimensional object.

35. The process of claim 34 including indexing said support in two dimensions and indexing and moving a dispensing means for dispensing said material in said fluent physical state in a third dimension.

36. The process of claim 33 including dispensing said material within a gaseous atmosphere.

37. The process of claim 33 including dispensing said material in the form of a strand having a prescribed cross section according to the object being manufactured.

38. The process of claim 33 wherein said object is constructed by dispensing an extrusion in the form of generally continuous strands of said material in layers built up on one another.

39. The process of claim 38 wherein a cross-sectional profile of said extrusion is controlled according to said object being manufactured.

40. The process of claim 38 including controlling a gap dimension between said layers to control the smoothness of said object in accordance with a dimension of a cross-section of said strand.

41. A process for automatically manufacturing a three-dimensional object which has been designed on a computer machine comprising:
   a) providing a design data file of coordinates representing said three dimensional design as generated by said computer machine;
   b) generating control signals based on said design data file;
   c) dispensing a fluid material in a fluent physical state in response to said control signals;
   d) treating said fluent material by causing a generally concentrated energy beam to physically act upon said fluid material after dispensing in controlled time and dimensional relation to said dispensing of said fluid material to cause said fluid material to undergo a transition to a fixed, physical state in which said material is solidified in a form of said three dimensional object; and
   e) shielding said dispensing means from said energy beam in a controlled manner so that said energy beam acts upon said fluid material at a prescribed position, intensity, and time so as to cause said material to solidify and accurately construct said three dimensional object.

42. The process of claim 41 dispensing said fluid material with a dispensing means while supporting said dispensing material with a support means; and
   indexing the relative positions of said dispensing means and support means so that said fluid material is caused to solidify and construct said three dimensional object.

43. The process of claim 42 wherein said material is dispensed in the form of a generally continuous strand having a prescribed cross-sectional profile; and
   controlling the indexing of said relative position between said dispensing means and support means in accordance with a magnitude of a dimension of a cross-section of said strand.

44. The process of claim 41 including controlling the reflection of said energy beam to prevent its effect upon said fluid material except at said prescribed contact area.

45. The process of claim 41 including dispensing said material in the form of a generally continuous strand and building up said strands on one another to construct said object.

46. The process of claim 45 including indexing said strands as they lay upon one another in two dimensions in constructing said object.

47. The process of claim 41 including controlling the shape of said shield to a optimum curing and treatment conditions to solidify said strand and provide a dimensionally accurate object.

* * * * *